Dec. 3, 1968   C. F. MAXWELL ET AL   3,414,416
FEED PELLET MAKING MACHINE
Filed Sept. 15, 1967   2 Sheets-Sheet 2
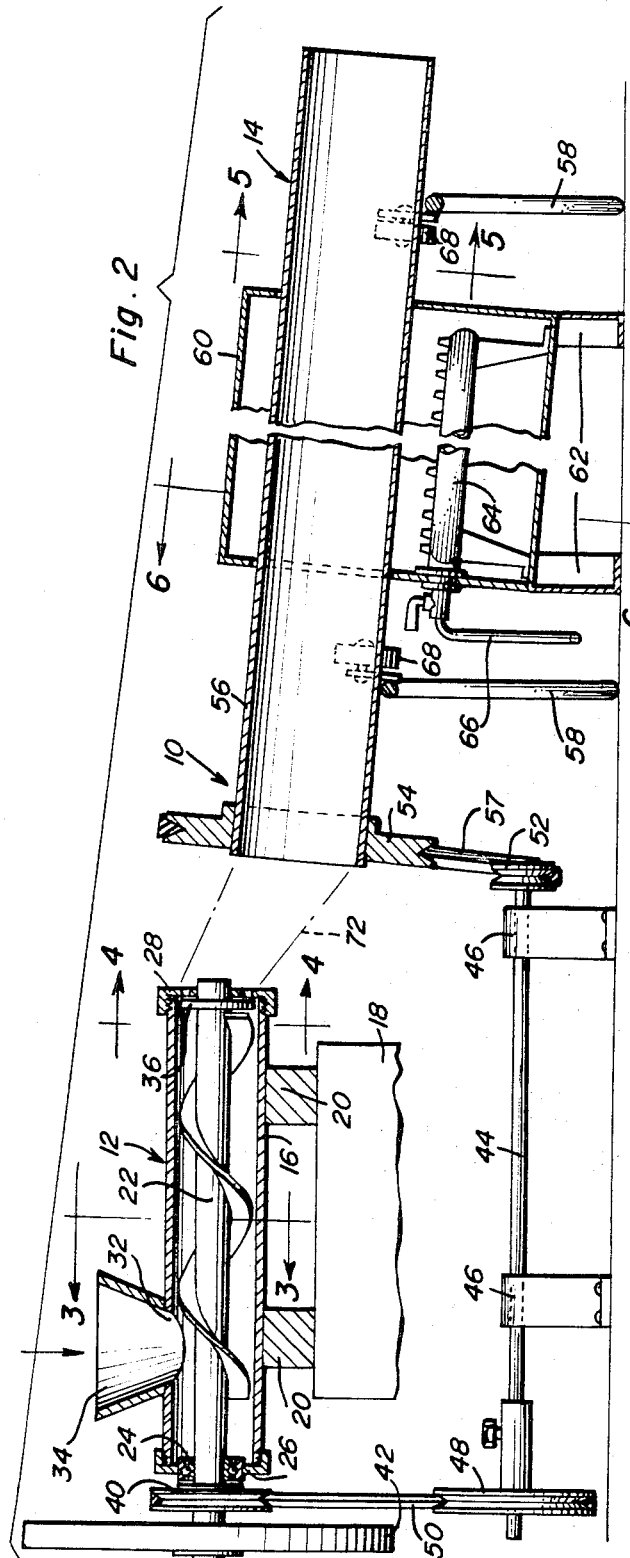
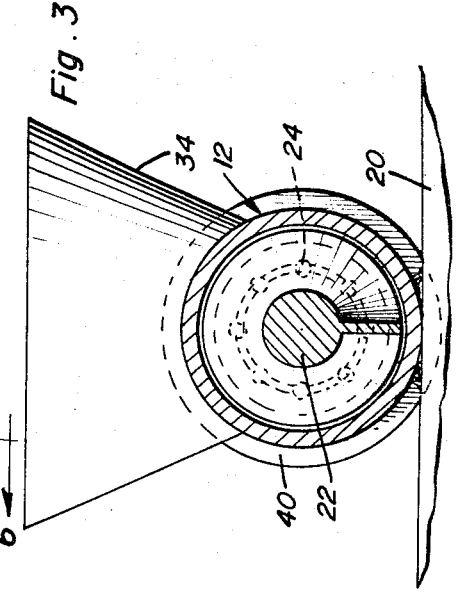
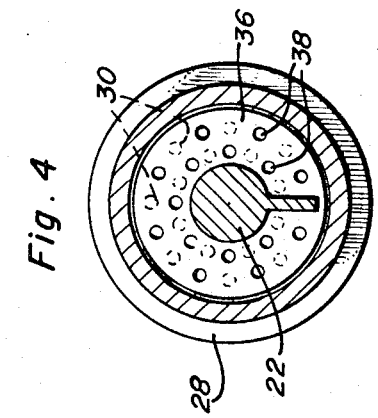
Claude F. Maxwell
Pairlee M. Maxwell
INVENTORS United States Patent Office 3,414,416
Patented Dec. 3, 1968

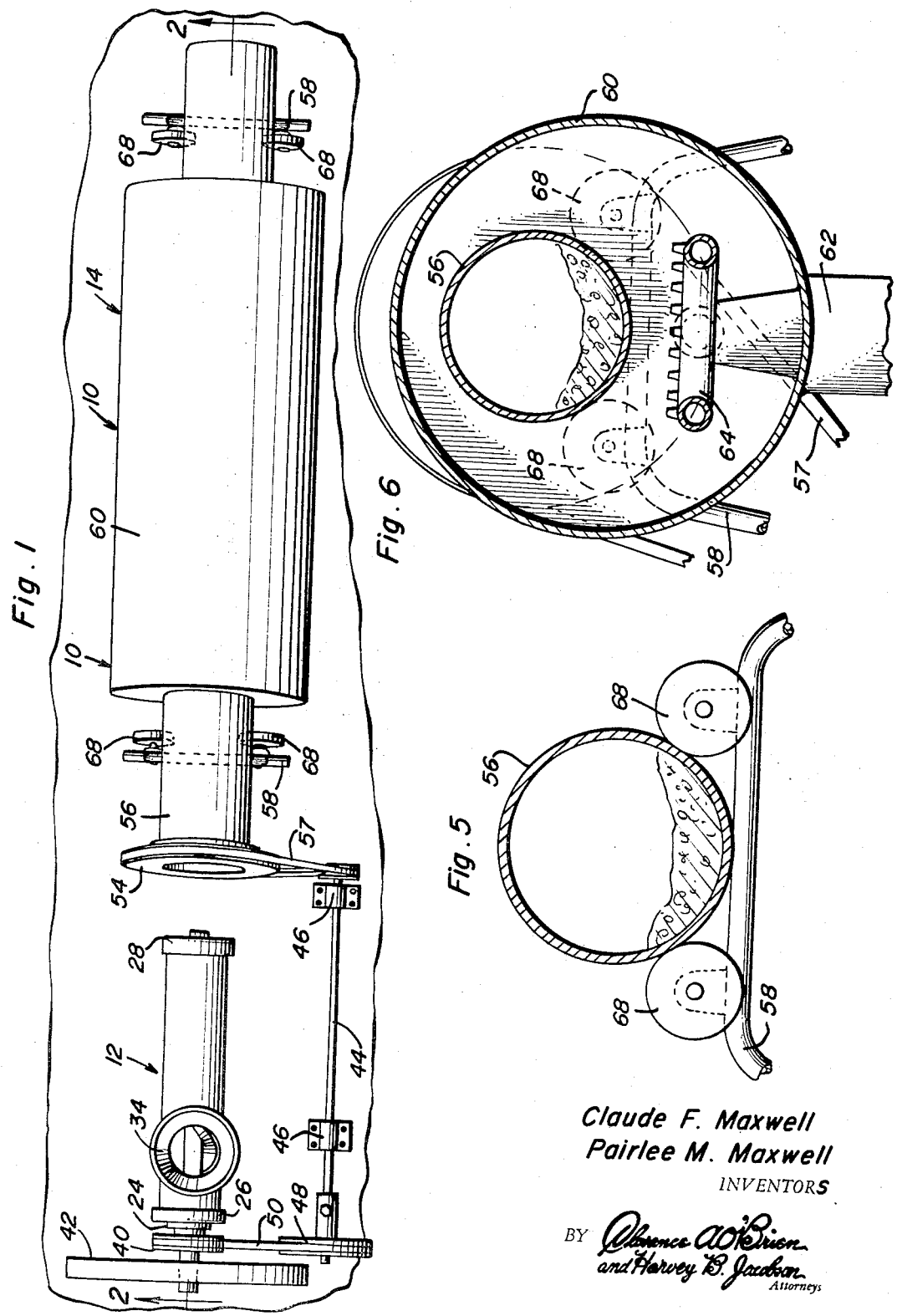

3,414,416
FEED PELLET MAKING MACHINE
Claude F. Maxwell and Pairlee M. Maxwell, both of
P.O. Box 33, Peach Orchard, Mo. 63872
Filed Sept. 15, 1967, Ser. No. 667,892
10 Claims. (Cl. 99—235)

ABSTRACT OF THE DISCLOSURE

A feed extruding machine adapted to receive an amount of moist compressible food material and operative to compress and extrude the food material in a horizontal direction from a discharge point on the machine for downward gravity discharge into the elevated end of a generally horizontally disposed but slightly inclined drum driven for slow rotation and including heating means operative to heat the inner surfaces of the drum.

---

The feed pellet making machine of the instant invention has been designed to be portable in nature and to be sufficiently small in proportions to be utilized on a small scale basis but also of sufficient proportions to be capable of reasonably large production.

By having the feed pellet making machine portable and yet of a size operable to make feed pellets in a reasonable volume, the machine may be manufactured and sold at a reasonable cost to and efficiently used by any persons having need for reasonable quantities of pellet feed.

The main object of this invention is to provide a feed pellet making machine that will be capable of making feed pellets in desirable quantity and yet which is small enough to be reasonably portable.

Another object of this invention is to provide a feed pellet making machine adapted to be driven by any suitable power source such as a power take-off of a tractor.

Still another object of this invention is to provide a machine in accordance with the preceding objects and which is completely devoid of any complex structure so as to be readily operable by substantially all persons having a need for a feed pellet making machine.

A final object of this invention to be specifically enumerated herein is to provide a machine in accordance with the preceding objects which will conform to conventional forms of manufacture, be of simple construction and automatic in operation so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the feed pellet making machine;

FIGURE 2 is an enlarged longitudinal vertical sectional view taken substantially upon the plane indicated by the section line 2—2 of FIGURE 1;

FIGURE 3 is a fragmentary enlarged transverse vertical sectional view taken substantially upon the plane indicated by the section line 3—3 of FIGURE 2;

FIGURE 4 is an enlarged transverse vertical sectional view taken substantially upon the plane indicated by the section line 4—4 of FIGURE 2;

FIGURE 5 is an enlarged fragmentary transverse vertical sectional view taken substantially upon the plane indicated by the section line 5—5 of FIGURE 2; and FIGURE 6 is a fragmentary enlarged transverse vertical sectional view taken substantially upon the plane indicated by the section line 6—6 of FIGURE 2.

Referring now more specifically to the drawings, the numeral 10 generally designates the pellet making machine. The machine 10 includes a food compressing and extruding assembly referred to in general by the reference numeral 12 and a drying assembly generally referred to by the reference numeral 14 provided for drying the food pellets extruded from the compressing and extruding machine 12.

The compressing and extruding machine 12 includes a cylindrical housing 16 supported from any suitable base structure 18 by means of mounting blocks 20. The housing 16 has an auger shaft 22 journaled therethrough by means of a bearing assembly 24 mounted in a removable front end cap 26 for the housing 12 and an apertured rear end cap 28 through which the adjacent end of the auger screw 22 is journaled and through whose apertures 30 moist and compressed food material is adapted to be horizontally rearwardly extruded.

The upper forward end portion of the housing 16 includes an opening 32 and the minor diameter end portion of a truncated funnel 34 is secured in the opening 32 whereby the funnel 34 will assist in placing moist food within the housing 16 to be subsequently compressed and extruded rearwardly through the rear end cap 28 of the housing 16.

The rear end of the auger shaft 22 has an apertured disk 36 mounted thereon disposed slightly forwardly of the end cap 28 and the apertures 38 formed in the disk 36 are registrable with the apertures 30 formed in the end cap 28. The forward end of the shaft 22 has a drive pulley 40 mounted thereon and a large driven pulley also serving as a flywheel and designated by the reference numeral 42. Of course, the driven pulley 42 may be driven from any suitable power source such as the power take-off of a tractor.

A lay shaft 44 extends along the housing 16 and is journaled by means of a pair of journal assemblies 46. The front end of the shaft 44 has a driven pulley 48 mounted thereon for rotation therewith and for adjustment longitudinally of the lay shaft 44. The drive pulley 40 is drivingly coupled to the driven pulley 48 by means of an endless drive member 50 and the rear end of the lay shaft 44 has a drive pulley 52 mounted thereon drivingly connected to a driven pulley 54 carried by the forward end portion of the drum section 56 by an endless drive member 57.

The drum section 56 is journaled for rotation about a slightly inclined axis by means of a pair of upstanding journal assemblies 58 engaged with the front and rear end portions of the drum section 56 and a generally cylindrical heat retaining drum assembly 60 is stationarily supported from support legs 62 thereof and encircles the drum section 56 intermediate its opposite ends for rotation of the drum section 56 relative to the heat retaining drum assembly 60.

The drum assembly 60 has a gas burner means 64 disposed therein suitably communicated with a source (not shown) of gas under pressure by means of valve controlled gas line 66.

The gas burner means 64 is positioned beneath the section of the drum section 56 enclosed by the heat retaining drum assembly 60 and therefore the gas burner means 64 is disposed in good heat transfer relation with the drum section 56.

The journal assemblies 58 each includes a pair of opposite side rollers 68 from which the corresponding end portion of the drum section 66 is rotatably journaled and each journal assembly 58 defines a generally inverted U-shaped transversely extending frame from which the corresponding pair of rollers 68 are journaled.

In operation, moist animal feed or the like may be disposed within the funnel 34 so as to feed downwardly into the housing 16 as the auger shaft 22 is rotated from a suitable power source. As the auger shaft 22 conveys the feed toward the rear end of the housing 16, the feed is compressed and forced through the apertures in the disk 36 and subsequently through the apertures 30 in the end cap 28. The end of the housing 16 from which the feed is extruded is positioned so as to enable the extruded feed to break off by gravity and fall into the elevated end of the drum section 56. Further, if it is desired, a suitable ramp (not shown) generally trough-shaped in configuration may be positioned as indicated by the phantom lines 72 in FIGURE 2 so as to ensure that the extruded feed will be discharged into the elevated end of the drum section 56.

Then, as the drum section 56 is rotated at a considerably slower speed than the auger shaft 22, the extruded moist pellets of feed discharged into the elevated end of the drum section 56 will be caused to tumble and move longitudinally along the drum section 56 by gravity toward the lower end thereof. Of course, when the gas burner means 64 is in operation, the drum section 56 is heated and therefore the moist pellets of food moving through the drum section 56 come in contact with the heated inner surfaces of the drum section 56 and are dried. The dried food pellets are discharged from the lower end of the drum section 56 into any suitable receptacle (not shown) provided therefor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A food pellet making machine including feed extruding means adapted to receive an amount of moist compressible food material and operable to compress and extrude said food material from a discharge point on said extruding means, a drying drum journaled for rotation about a generally horizontal but slightly inclined axis and positioned for receiving the extruded material from said discharge point into the elevated end thereof, said drum having heating means operative to heat the inner surfaces thereof, said drum being adapted to be driven and to thereby heat, dry and tumble said compressed and extruded material therethrough.

2. The combination of claim 1 wherein said feed extruding means includes means operable to extrude said compressed material in a generally horizontal direction from said discharge point whereby the free ends of the sections of extruded material will tend, by gravity, to break off and fall downwardly by gravity.

3. The combination of claim 2 wherein the elevated end of said drum is positioned to receive the broken and falling free ends of the material extruded from said discharge point.

4. The combination of claim 1 wherein said heating means comprises burner means disposed in good heat transfer relation with the outer surfaces of said drum.

5. The combination of claim 4 including heat shield means at least substantially enclosing said burner means and the portions of said drum with which said burner means is disposed in good heat transfer relation.

6. The combination of claim 5 wherein said feed extruding means includes means operable to extrude said compressed material in a generally horizontal direction from said discharge point whereby the free ends of the sections of extruded material will tend, by gravity, to break off and fall downwardly by gravity.

7. The combination of claim 6 wherein the elevated end of said drum is positioned to receive the broken and falling free ends of the material extruded from said discharge point.

8. The combination of claim 1 wherein said feed extruding means includes an elongated generally horizontally disposed casing, an auger screw shaft journaled through said casing, an apertured disk carried by the discharge end of said auger screw shaft, and an apertured end plate carried by the discharge end of said casing with whose apertures the apertures in said disk are intermittently registrable during rotation of said auger screw shaft, said end plate and disk being disposed in closely adjacent relation.

9. The combination of claim 8 including drive means operative to rotate said drum in response to rotation of said auger screw shaft.

10. The combination of claim 9 wherein said drive means is operative to rotate said drum at a speed slower than the rotational speed of said shaft.

References Cited

UNITED STATES PATENTS

| | | | |
|---|---|---|---|
| 1,825,475 | 9/1931 | Pfeiffer | 100—98 X |
| 2,772,642 | 12/1956 | Lindl | 991—235 |
| 3,063,361 | 11/1962 | Gehrke | 100—98 X |

ROBERT W. JENKINS, *Primary Examiner.*